US010135749B2

(12) United States Patent
Soni et al.

(10) Patent No.: US 10,135,749 B2
(45) Date of Patent: Nov. 20, 2018

(54) MAINFRAME MIGRATION TOOLS

(71) Applicant: Sears Brands, LLC, Hoffman Estates, IL (US)

(72) Inventors: Himanshu Soni, Maharashtra (IN); Tanveer Akhter Khan, Madhya Pradesh (IN); Sudip Mitra, Jharkhand (IN); Ravinder Kumar, New Delhi (IN); Subir Chatterjee, West Bengal (IN); Kesavan Srinivasan, Maharashtra (IN)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 1075 days.

(21) Appl. No.: 14/087,601

(22) Filed: Nov. 22, 2013

(65) Prior Publication Data

US 2015/0089063 A1 Mar. 26, 2015

(30) Foreign Application Priority Data

Sep. 23, 2013 (IN) .......................... 2794/DEL/2013

(51) Int. Cl.
| | |
|---|---|
| *G06F 15/173* | (2006.01) |
| *H04L 12/911* | (2013.01) |
| *G06F 11/30* | (2006.01) |
| *G06F 11/32* | (2006.01) |
| *G06F 9/48* | (2006.01) |
| *H04L 29/08* | (2006.01) |
| *G06F 11/34* | (2006.01) |

(52) U.S. Cl.
CPC .......... *H04L 47/70* (2013.01); *G06F 11/3003* (2013.01); *G06F 11/323* (2013.01);
(Continued)

(58) Field of Classification Search
CPC .......... G06F 11/206; G06F 2009/4557; G06F 9/5088; G06F 9/4856; G06F 9/541;
(Continued)

(56) References Cited

U.S. PATENT DOCUMENTS

| | | | | |
|---|---|---|---|---|
| 5,678,044 A | * | 10/1997 | Pastilha | .................... G06F 8/37 |
| 2005/0044197 A1 | * | 2/2005 | Lai | ......................... G06Q 10/10 |
| | | | | 709/223 |

(Continued)

OTHER PUBLICATIONS

JCL/Analyzer, User Reference Guide Release 4.2, CSI International, Jan. 22, 2003.*

(Continued)

*Primary Examiner* — Jungwon Chang
(74) *Attorney, Agent, or Firm* — McAndrews, Held & Malloy, Ltd.

(57) ABSTRACT

Methods, systems, and computer readable storage media are disclosed that aid migration team members with migrating software applications from one platform to another platform, and more particularly, with tools that aid in migrating mainframe applications to a lower cost platform. The tools include legacy statistical generators that scan and analyze components of a mainframe application as well as the datasets associated with the mainframe application. The legacy statistical generators as a result of such analysis extract various statistical information regarding the application and datasets and provide such extracted information to a web-enabled application. Migration team members may use the web-enabled application to gain insight into the structure of the mainframe application as well as determine progress of migrating the mainframe application to the lower cost platform.

18 Claims, 10 Drawing Sheets

(52) U.S. Cl.
CPC ........ *G06F 9/4843* (2013.01); *G06F 11/3452* (2013.01); *G06F 2201/865* (2013.01); *H04L 67/02* (2013.01); *H04L 67/16* (2013.01)

(58) Field of Classification Search
CPC ............. G06F 9/5072; G06F 17/30563; G06F 17/303; G06F 8/37; G06F 9/4843; G06F 8/30; G06F 11/3003; G06F 11/323; G06F 11/3452; G06F 2201/865; G06Q 10/10; H04L 47/70; H04L 67/16; H04L 67/02
USPC ......... 718/104, 101, 100; 707/635; 717/120; 709/226, 202, 223–224
See application file for complete search history.

(56) References Cited

U.S. PATENT DOCUMENTS

| | | | | |
|---|---|---|---|---|
| 2006/0041862 A1* | 2/2006 | Moussallam | ........... | G06F 9/541 717/120 |
| 2008/0270515 A1* | 10/2008 | Chen | ..................... | G06F 9/4856 709/202 |
| 2009/0240704 A1* | 9/2009 | Zimowski | ............. | G06F 17/303 |
| 2010/0287560 A1* | 11/2010 | Neft | ...................... | G06F 9/4856 718/104 |
| 2011/0035746 A1* | 2/2011 | Takai | ........................ | G06F 8/30 718/100 |
| 2012/0246651 A1* | 9/2012 | Li | ......................... | G06F 9/4843 718/101 |
| 2014/0019977 A1* | 1/2014 | Kakade | ................. | G06F 9/5072 718/101 |
| 2014/0101105 A1* | 4/2014 | Lee | ................... | G06F 17/30563 707/635 |

OTHER PUBLICATIONS

"Copybook (programming)", Wikipedia, the free encyclopedia, Aug. 30, 2013, 2 pages.

"Job Control Lanuage", Wikipedia, the free encyclopedia, Aug. 30, 2013, 9 pages.

* cited by examiner

MAINFRAME MIGRATION TOOLS

FIELD OF THE INVENTION

Various example embodiments relate to tools that aid with migrating software applications from one platform to another platform, and more particularly, to tools that aid in migrating a mainframe application to another platform.

BACKGROUND OF THE INVENTION

Businesses may consider migrating existing mainframe applications to lower cost platforms. However, migrating mainframe applications generally entails a significant amount of manual effort. Such effort may involve gathering statistical information about a mainframe application and associated data. The statistical information may be used to plan, implement, and track progress of migrating the respective application to a different platform. Unfortunately, such manual effort is time consuming and error prone, thus increasing costs associated with migrating the application. Accordingly, automated tools may reduce the manual effort, increase accuracy of gathered statistical information, and/or provide information not realistically obtainable via a manual process.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Methods, systems, and computer readable storage media for extracting, analyzing, and/or presenting statistical information regarding mainframe applications are substantially shown in and/or described in connection with at least one of the figures, and are set forth more completely in the claims.

These and other advantages, aspects and novel features of the present invention, as well as details of an illustrated example embodiment thereof, will be more fully understood from the following description and drawings.

DETAILED DESCRIPTION OF THE INVENTION

Aspects of the present invention are related to methods, systems, and computer readable storage media that may aid persons tasked with migrating mainframe applications to another platform. In particular, some aspects of the present invention are related to methods, systems, and computer readable storage media that provide automated tools configured to extract, analyze, and/or present statistical information regarding mainframe applications.

Figure 1:
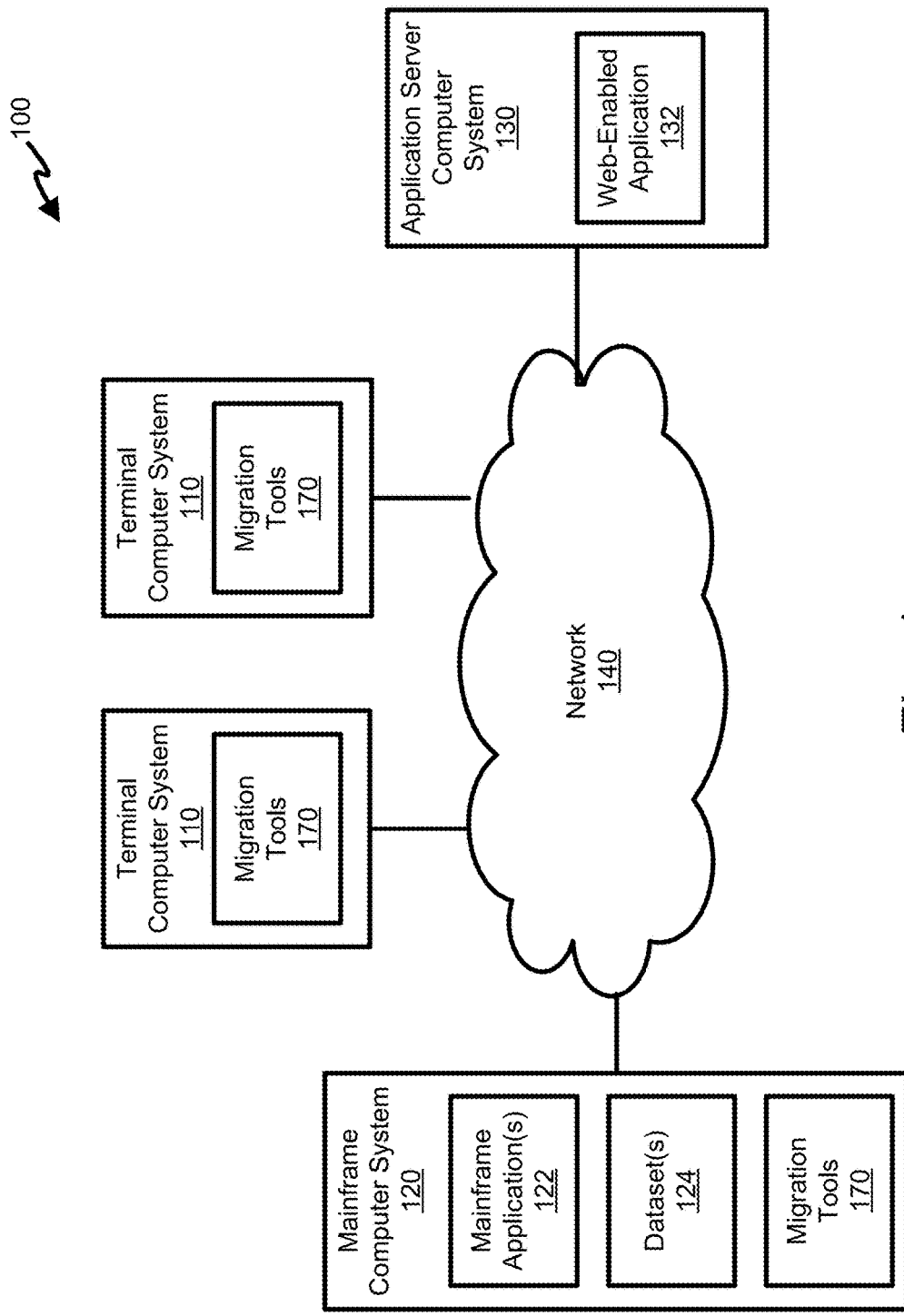
FIG. 1 shows a migration system in accordance with an example embodiment of the present invention.

Shown in FIG. 1 is an example embodiment of a migration system 100 that provides migration tools configured to extract, analyze, and/or present statistical information regarding mainframe applications 122. The migration system 100 may include one or more terminal computing devices and/or systems 110, one or more mainframe computing devices and/or systems 120, and one or more application server computing devices and/or systems 130. A network 140 may operably couple the terminal computer systems 110, the mainframe computer systems 120, and application server computing system 130 together. To this end, the network 140 may include a number of private and/or public networks such as, for example, wireless and/or wired LAN networks, cellular networks, and/or the Internet that collectively provide a communication path and/or paths between the terminal computer systems 110, the mainframe computer systems 120, and the application server computer systems 130.

Each terminal computer system 110 may include a desktop, a laptop, a work station, a dumb terminal, and/or some other type of computing device which enables a user to communicate with the mainframe computer system 120 and/or the application server computer system 130 the network 140. In particular, the terminal computer systems 110 may permit migration team members to access and analyze mainframe applications 122 and associated datasets 124.

The mainframe computer system 120 may be generally configured to execute mainframe applications 122 and process and/or manipulate datasets 124 in accordance with such applications 122. To this end, the mainframe computer system 120 may include and/or maintain several computer-readable databases, tables, queues, and/or other data structures. In particular, the mainframe computer system 120 may comprise one or more mass storage devices and/or databases that store and maintain mainframe applications 122 and associated datasets 124 and may contain processors and/or other logic circuitry configured to execute the mainframe applications 122 and process associated datasets 124.

The application server computer systems 130 may be generally configured to present statistical information regarding a mainframe application 122. To this end, the application server computer systems 130 may include one or more web servers and associated database servers. The database servers may receive and store information gathered, collected, and/or otherwise determined from an analysis of the mainframe applications 122. The web servers in turn may provide a web-enabled application 132 to migration team members tasked with migrating the mainframe applications 122. The web-enabled application 132 may provide various reports, views, etc. that aid such persons in understanding structures of the mainframe applications 122 and the achieved progress of migrating a mainframe application 122.

The migration system 100 may further provide migration tools 170 that permit migration team members to extract, analyze, and/or present statistical information regarding mainframe applications 122. In particular, the migrations tools 170 may be implemented using one or more software and/or firmware modules. Such modules may comprise instructions that are executed by the terminal computer systems 110, the mainframe computer system 120, and/or application server computer systems 130. As noted above, the application server computer systems 130 may provide a web-enabled application 132 that aids in migrating the mainframe applications 122. The web-enabled application 132 may be one of several migration tools 170 provided by the migration system 100. In particular, the migration system 100 may further include various legacy statistics generators and/or other information gathering tools that analyze mainframe applications 122. Such stat generators may extract information from mainframe applications 122 and populate various databases of the application server computer systems 130 with appropriate information regarding the mainframe applications 122.

Figure 2:
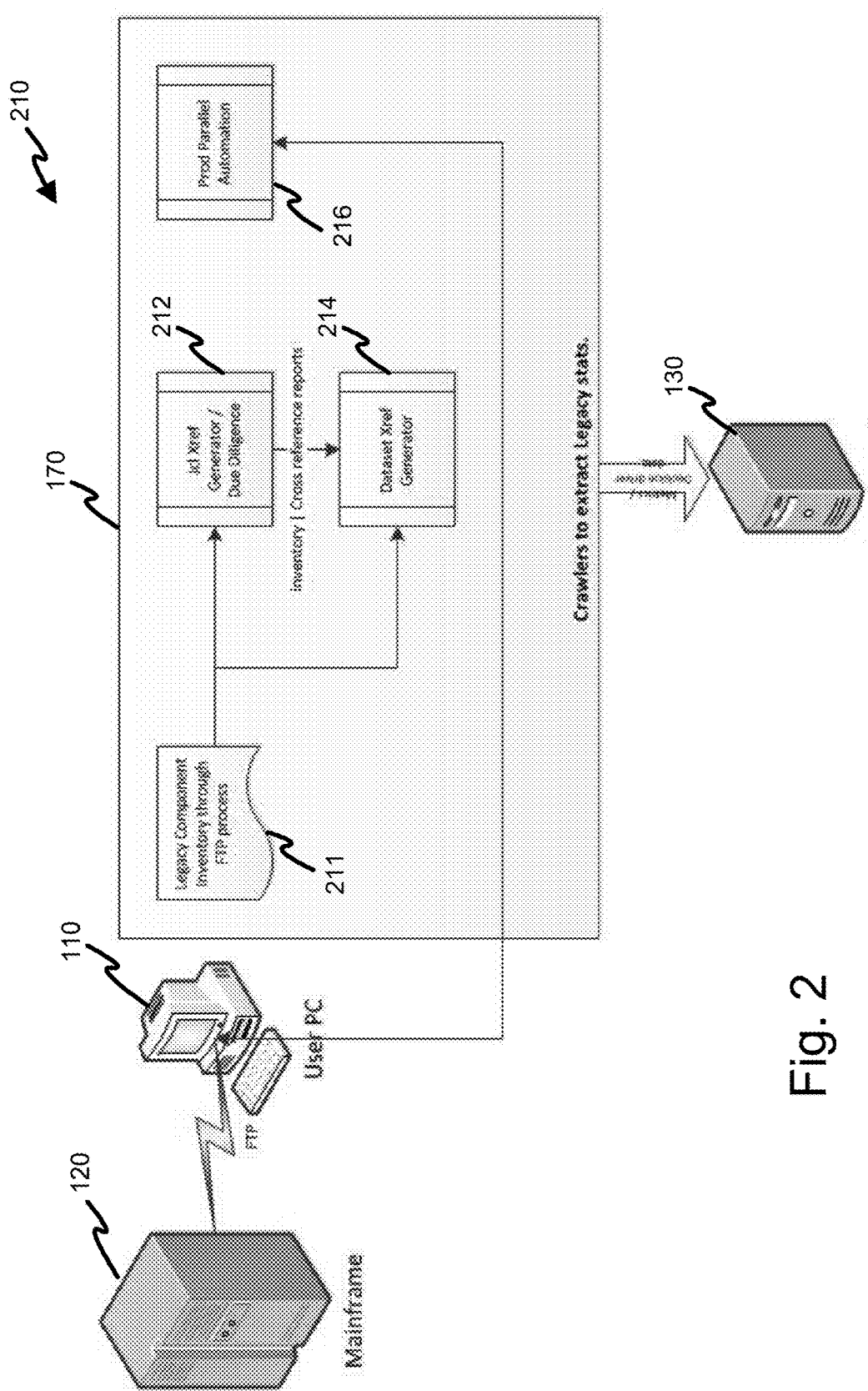
FIG. 2 shows an example high level diagram of migration tools provided by the migration system of FIG. 1.

FIG. 2 provides an example high level block diagram of the migration tools 170 and their interaction with computer systems 110, 120, and 130 of FIG. 1. As shown, the migration tools 170 may include stat generators 210 that may be executed by the terminal computer system 110. The stat generators 210 may include a set of different modules which function independently to extract legacy statistical information such as, for example, various metrics and data regarding mainframe applications 122. Moreover, the stat generators 210 may provide such extracted legacy statistical information to the application server computer system 130. The application server computer system 130 may provide a web-enabled application 132 that permits migration team members to mine the legacy statistical information and generate various reports and metrics to augment tracking of application migration. The application server computer system 130 may also serve as a data store to hold end-to-end migration data.

Historically, migration teams struggled with manually generating legacy statistical information used to migrate a single mainframe application. In particular, it was not uncommon for migration teams to spend many days gathering rudimentary legacy statistical information for a single mainframe application. Conversely, the stat generators 210 may generate and/or gather legacy statistical information for multiple mainframe applications 122 in the span of hours. Besides handling multiple applications 122 in a much shorter time span, the legacy statistical information gathered by the stat generators 210 may be more detailed and more accurate than the rudimentary legacy statistical information historically generated for a single mainframe application via manual extraction techniques.

Each mainframe application 122 generally comprises several components. In order to reduce the risk of interfering with proper operation of the mainframe computer systems 120 and the execution of the mainframe applications 122, the migration tools 170 may include an FTP (file transfer protocol) client or process 211. A migration team member may use the FTP client 211 to transfer copies of the mainframe application components to a terminal computer system 110 for processing by stat generators 210. However, in other example embodiments, the migration team member may use other techniques to transfer the mainframe application components to the terminal computer system 110 for processing. In yet other example embodiments, the migration team member may forego transferring the mainframe application components to a terminal computer system 100 and may simply cause the stat generators 210 to directly analyze the mainframe application components that reside on the mainframe computer system 120.

Regardless, the migration team member may cause the terminal computer system 100 to execute the stat generators 210. The executed stat generators 210 may parse the mainframe application components, extract relevant legacy statistical information, and cause such extracted legacy statistical information to be stored in one or more databases of the web application 220. As shown in FIG. 2, the stat generators 210 may include a JCL (job control language) cross reference (XREF) generator 212, a dataset cross reference (XREF) generator 214, and a mainframe runtime (RT) statistics generator 216.

A mainframe application 122 generally comprises a job or a series of jobs to be executed by the mainframe computer system 120. A job file, typically written in a scripting language or job control language, generally sets forth the steps to be executed by the mainframe computer system 120 as a result of executing the job defined by the file. The JCL XREF generator 212 may scan such a job file in order to extract various legacy statistical information regarding the steps set forth in the job file. In particular, the JCL XREF generator 212 may extract the number of jobs each application owns, the number of programs each job executes, the number of utilities/subroutines each job calls, programs called within a program. The JCL XREF generator 212 may further extract the number of files accessed/created by programs/jobs of the mainframe application 122. The JCL XREF generator 212 may further generate a CRUD (create, read, update, delete) report which provides the number and type of operations performed on database tables by the job. Furthermore, the JCL XREF generator 212 may extract the lines of code, complexity, and type of each program of the job. The JCL XREF generator 212 may also determine and provide information regarding whether a program has stored procedures or involves IMS (information management system) database calls.

The legacy statistical information generated/extracted by the JCL XREF generator 212 may aid in defining an overall migration plan, estimating effort/time for migrating an mainframe application, and deciding on a migration strategy. In particular, the legacy statistical information provided by the JCL XREF generator 212 may enable a migration team to recognize early in the migration process potential issues such as competency gaps in the migration team.

The dataset XREF generator 214 may generally scan each mainframe component (e.g., JCL/Procs, COBOL program, Copybooks, etc.) and identify the record layout for each file. The record layout generally defines the structure in which data is entered in the file. The dataset XREF generator 214 may further generate metrics related to mainframe datasets 124 and its usage within and outside the application 122. For example, the dataset XREF generator 214 may identify datasets 124 used in DB2 unload, referred by only utilities or programs or both, and/or interface points with other applications, etc.

The mainframe runtime (RT) statistics generator 216 may extract various runtime information for the mainframe application. For example, the RT statistics generator 216 may determine the throughput and volume of data that each mainframe job processes. The RT statistics generator 216 may also determine other runtime information such as a job's window of execution, a number of times a particular job executes, and throughput for each file processed by these jobs. Traditionally, runtime information was manually extracted by a migration team member who logged into a mainframe session and examined logs of each executed job.

Based on such examination, the team member may manually key in the relevant log data into a spreadsheet. Such a manual process was very time intensive. For example, a team member may spend 2-3 weeks extracting such runtime information from the logs of a medium sized application. The RT statistics generator 216, however, may extract runtime information in a much quicker and precise manner. For example, an extraction that took 2-3 weeks via manual processes may be accomplished by the RT statistics generator 216 in an hour.

Figure 3:
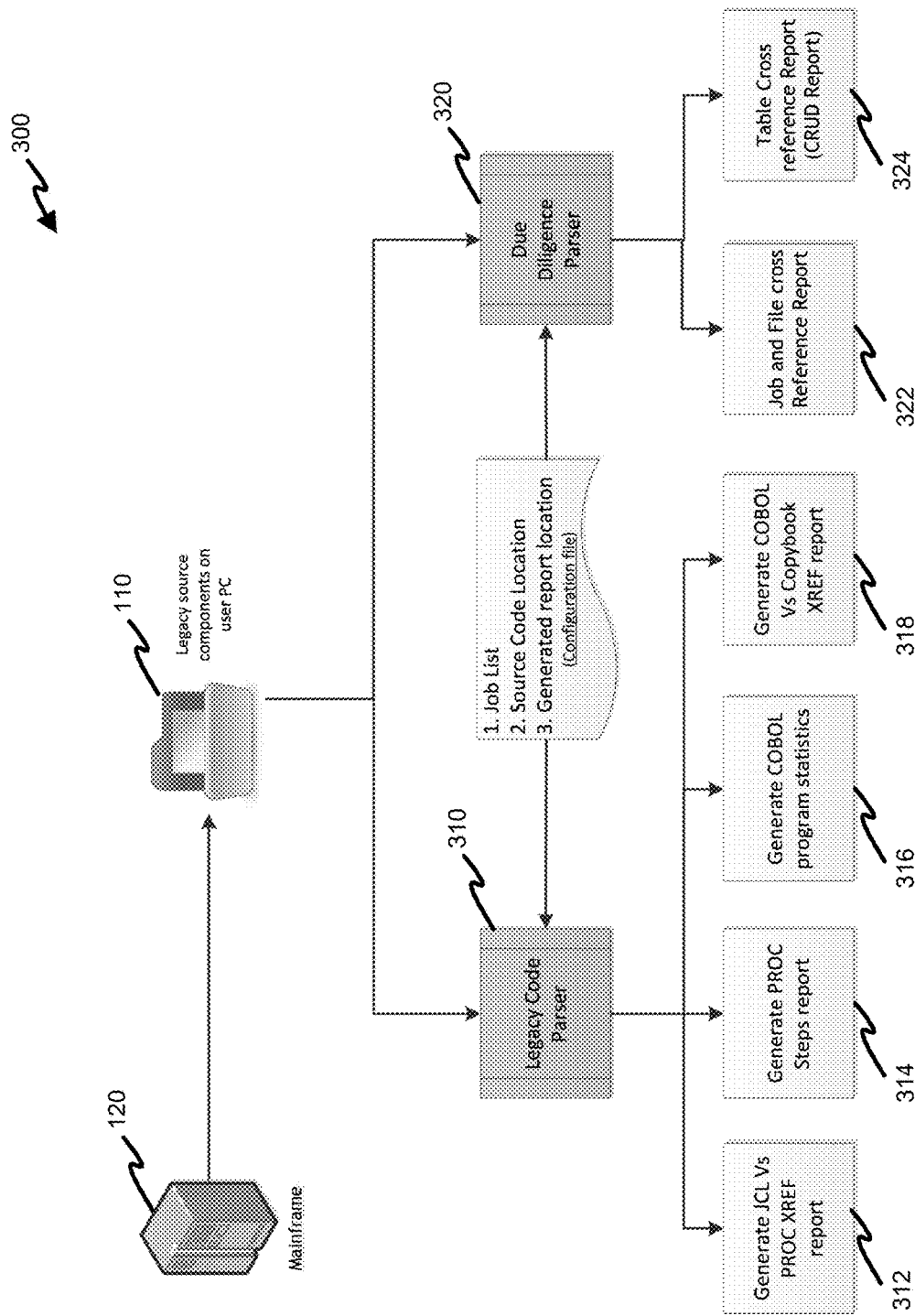
FIG. 3 shows an example embodiment of a JCL XREF generator of the migration system of FIG. 1.

Referring now to FIG. 3, an example embodiment 300 of the JCL XREF generator 212 is shown. Execution of the JCL XREF generator 212 may be performed as one of the first steps of a legacy migration effort. In particular, the execution of the JCL XREF generator 212 may result in a thorough analysis of the existing legacy application 122 being migrated. The JCL XREF generator 212 may identify a complete inventory list of components of the mainframe application 122 and interactions between such components. The JCL XREF generator 212 may provide the migration team with an understanding of scope and complexity of the mainframe application 122 and may identify statistical information of the mainframe application that are vital to driving migration decisions. The legacy statistical information precisely extracted by the JCL XREF generator 212 may help the migration team to estimate the overall migration plan/milestones, define effort/time estimates, and define a migration strategy.

As shown, the JCL XREF generator 300 may comprise a legacy code parser 310 and a due diligence parser 320. The legacy code parser 310 and due diligence parser 320 may read the source code for the application components which were transferred to the terminal computer system 110. In particular, the legacy code parser 310 and due diligence parser 320 may parse each line of the COBOL, JCL/Proc, and/or other source code components of the mainframe application 122 and generate various reports based upon such parsing.

In particular, the legacy code parser 310, in one example embodiment, generates a JCL-Procedure XREF report 312, a Procedure XREF report 314, a COBOL stat report 316, and a COBOL CB XREF report 318. As known in the art, a JCL file is a scripting language file that defines a job as one or more steps to be executed by the mainframe computer system 120. The JCL file may include Procedures or PROCS which are references to JCL files that provide steps or groups of steps that may be inserted into the job. The JCL-Procedure XREF report 312 may list JCL files of the mainframe application 122 and associated procedures (and programs/utilities) executed by each listed JCL file. In particular, the JCL-Procedure XREF report 312 may include, among other things, the Job or JCL Name for each JCL file and the PROC or Procedure name for each procedure referenced by the respective JCL file.

The Procedure XREF report 314 may list steps, programs, and/or utilities in a PROC and thus executed by the mainframe computer system 120 as a result of executing the respective PROC. In particular, the procedure XREF report 314 may include, among other things, procedure name, the sequence number inside the procedure for a respective step, the step name of an EXEC step, the name of the program of utility executed by the step, and remarks or comments associated with the executed step (e.g., QUICKJOB Program or COBOL Program, or COBOL DB2 program).

The COBOL stat report 316 may include statistics of a COBOL program gathered by the legacy code parser 310. In particular, the COBOL stat report 316 may include legacy statistical information that may help in assessing the complexity of a particular COBOL program. A COBOL program may include multiple calling chains. The legacy code parser 310 may be designed to capture $n^{th}$ level subroutine calling and report the results of such captured calling. In particular, the COBOL stat report 316 may include, among other things, columns of basic statistics about the COBOL program such as, for example, a COBOL program name column that provides the name of the COBOL program, and a total lines of code (LOC) column which may include a count of the lines of code in the COBOL program include referenced copybooks and procedural copybooks, and procedure LOC which provide a LOC count for procedures of the COBOL program.

The COBOL stat report 316 may further include various database statistics for the COBOL program. For example, the COBOL stat report 316 may include a SQL (Structured Query Language) column which provides a total SQL count for SQL queries inside program and procedural copybooks. The COBOL stat report 316 may further include a DML (data manipulation language) SQL column which provides a INS/UPD/DEL SQL count. The COBOL stat report 316 may also include STOREPROC Calls column which provides a DB2 stored procedure call count, and a fetch first column which provides an indication of DB2 fetch first logic. The COBOL stat report 316 may also include a IMS calls column which identifies IMS calls inside the program or procedural copybooks, an IMS update calls column which provides a INS/UPD/DEL IMS call count.

The COBOL stat report 316 may also include various statistics regarding storage and messaging. For example, the COBOL stat report 316 may include an online program column that may indicate whether CICS (customer information control system) calls are present in the COBOL program, and an MQ (message queue) calls column to indicate whether any MQ calls are present in the COBOL program. The COBOL stat report 316 may also include a VSAM (virtual storage access method) file column to indicate if a VSAM file is used in the COBOL program.

The COBOL stat report 316 may further provide various statistics regarding the structure of the COBOL program. For example, the COBOL stat report 316 may include a cyclometric counts column that indicates the number of conditions or different execution paths in the COBOL program. The COBOL stat report 316 may also include a subroutine/stored procedure column that lists subroutines or stored procedures called from the COBOL programs.

The COBOL CB XREF report 318 may provide various statistics regarding copybooks referenced by the COBOL program. In particular, the COBOL CB XREF report 318 may list copybooks, DB2 DCLGEN (declaration generator), and procedural copybooks used by COBOL program. In particular, the COBOL CB XREF report 318 may include a copybook column that provides the name of a copybook or DCLGEN referenced in the COBOL program. The report may further include a program column which provides the name of the COBOL program, and a CB LOC column which provides a lines of code count for the copybook. The COBOL CB XREF report 318 may further include a remarks column that includes an indication of whether the copybook is a procedural copybook or a DB2 table name.

Turning now to the due diligence parser 320, the due diligence parser 320, in one example embodiment, may generate a Job XREF report 322 and a CRUD report 324. The Job XREF report 322 may provide various statistical information for a particular job. In one example embodiment, the Job XREF report 322 may include a job name, a procedure name, a step name, and a program name. The job XREF report 322 may further include a file name, a LOC count for the job, and a type of module.

The CRUD report 324 generated by the due diligence parser 320 may provide legacy statistical information about the tables used in a program. In particular, the CRUD report 324 may include a job name, a program name, and a table name. The CRUD report 324 may further include an indication of an operation performed (e.g. Insert/Select/Update/Delete etc.). The CRUD report 324 may also include an indication of whether fetch first row only is used or not.

The above reports may aid and/or benefit the migration team in various ways. In particular, generation of the above reports may require minimal manual intervention of migration team members. In order to generate the above mentioned reports, a team member would historically spend a huge amount of manual effort. The expenditure of such manual effort, however, does not eliminate possibilities of human error. Now, a migration team member may feed in list of jobs to the JCL XREF generator 212, and the JCL XREF generator 212 may capture the relevant legacy statistical information in a few minutes.

The above described reports capture around 35-40 attributes which may be further transformed to generate even further reports to aid the migration team in making various decision associated with a migration. In particular, the migration team may use such reports to precisely plan and estimate time and costs of a particular migration. Also, such reports may facilitate early discussions/decisions on potential road blocks and may help avoid risk to overall delivery plans. For example, such reports may identify resources that are unavailable (e.g., assembler proficiency) in the migration team or a need for a proof of concept implementation to address specific use cases.

Furthermore, in one example embodiment, the JCL XREF generator 212 may generate the reports in widely accessible formats such as comma separated or spreadsheet formats. Such formats may permit migration team members as well as less technical stakeholders to quickly reformat, filter, and/or manipulate the reports to obtain further insight into the migration.

Figure 4:
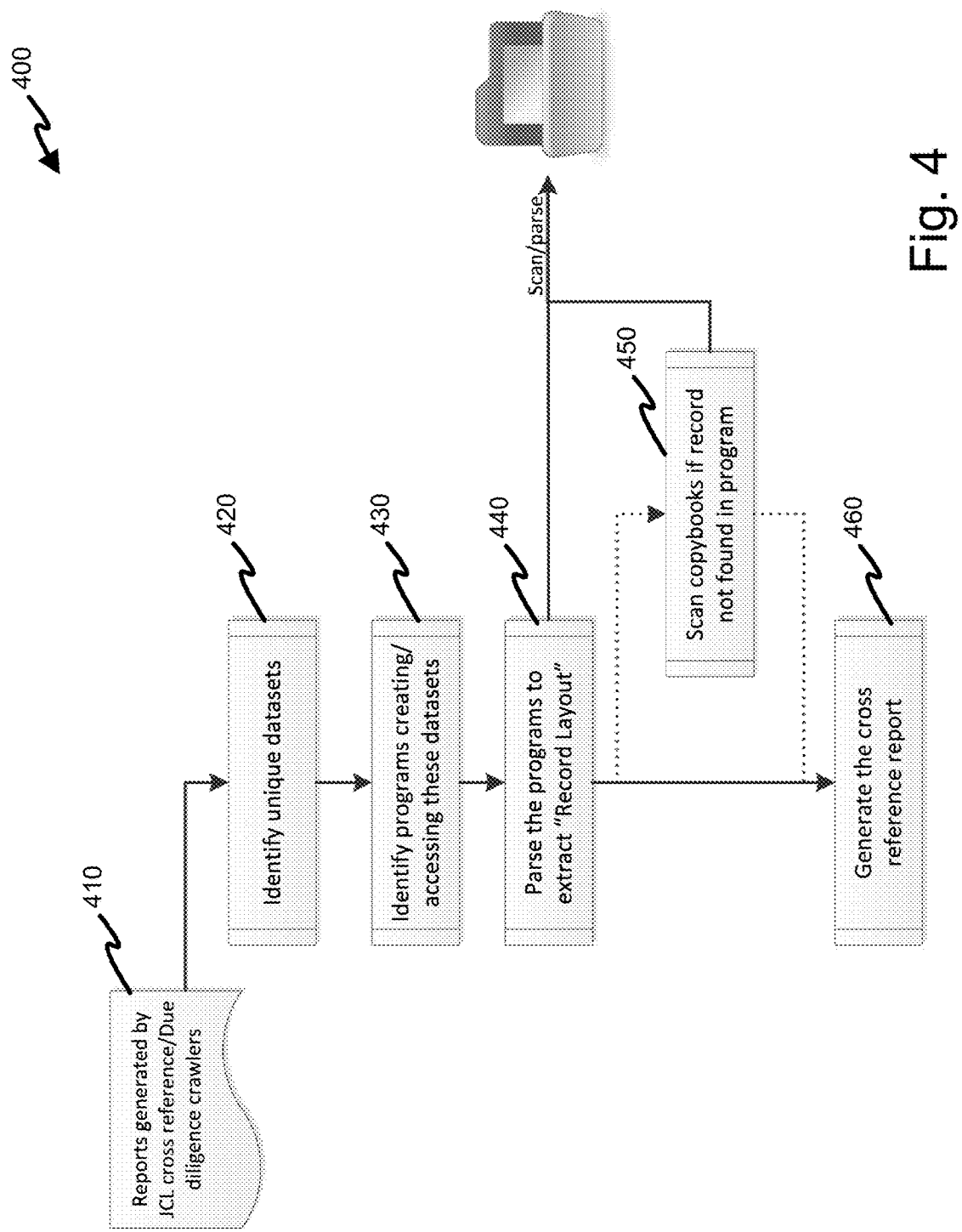
FIG. 4 shows a flowchart of an example embodiment of a method implemented by a dataset XREF generator of the migration system shown in FIG. 1.

Referring now to FIG. 4, a flowchart of a method 400 implemented by an example embodiment of the dataset XREF generator 214 is shown. Execution of the dataset XREF generator 214 may scan mainframe components (e.g. JCL, Proc, COBOL programs, Copybooks, etc.) based on reports generated by JCL Cross reference generator 300. In response to such scanning, the dataset XREF generator 214 may identify the record layout for each file. The record layout may define the structure in which the data is entered in the file. The dataset XREF generator 214 may generate various metrics related to mainframe datasets 124 and usage of the datasets 124 within and outside the application.

As shown, the dataset XREF generator 214 may start at 410 with the reports generated by the JCL XREF generator 212 for a group of one or more jobs to be migrated. At 420, the dataset XREF generator 214 may identify unique datasets 124 operated on by the jobs of the group reported upon by the JCL XREF generator 212. In particular, the dataset XREF generator 214 may parse the generated reports for the group of jobs to determine which datasets 124 are operated upon by the jobs of the group. Based upon such parsing of the reports, the dataset XREF generator 214 may extract a list of unique datasets 124 accessed by the group of jobs. For example, an average sized legacy mainframe application 122 may have approximately 1000 to couple of thousand datasets 124.

At 430, the dataset XREF generator 214 may identify which programs and/or utilities create and/or access the identified datasets 124. In particular, the dataset XREF generator 214 may scan each dataset to identify which programs/utilities are accessing/creating these datasets 124. Upon obtaining the list of programs for each dataset, the dataset XREF generator 214 at 440 may parse each identified program and/or utility to determine a record layout or structure in which data is written into a file. If programs are using copybooks, the dataset XREF generator 214 at 450 may scan a programs versus copybook report such as the COBOL CB XREF report 318 described above to obtain a list of copybooks to be scanned for the desired record layout. The dataset XREF generator 214 at 460 may then generated a dataset XREF report based on legacy statistical information gleaned from the reports and its processing of such reports. In particular, the dataset XREF generator 214 may cause the dataset XREF report to include details regarding each dataset 124. Such details may include its record layout, which programs are accessing the dataset 124, whether the dataset 124 is part of a database operation, whether the dataset is used as intermediate file, etc.

A migration team may be able to manually extract the record layout and other information for a single dataset in approximately 5-10 minutes. However, a mainframe application may include between 1500 to 2000 datasets 124. One example embodiment of the dataset XREF generator 214 may scan and generate the dataset XREF report for such a mainframe application of 1500 to 2000 datasets 124 in 5-10 minutes. As such, the dataset XREF generator 214 may save a migration team a huge amount of manual effort and time. Moreover, the dataset XREF generator 214 is very likely to generate a more precise report than what can be achieved using manual processes.

In one example embodiment, the dataset XREF generator 214 generates a dataset XREF report that includes legacy statistical information, for each identified dataset 124, a dataset name and a layout that provides a detailed representation of the dataset 124 (e.g., a COBOL representation). The report may further include comments that provide information about the dataset 124, a list of programs/utilities that access the dataset 124, and indication of whether the dataset 124 is only used by utilities. The report may further include an indication of whether the dataset 124 is created/accessed by quickjobs, whether the dataset 124 is created/accessed by DB2 related utilities, and/or whether the dataset 124 is created/accessed by Teradata related utilities. The report may also include whether the dataset 124 is deleted at any point during execution of a job, and a list of jobs that delete the dataset 124.

The above dataset XREF report may permit the migration team to extract information that is helpful in migrating a mainframe application 122. In particular, the migration team may determine which datasets 124 are accessed only by utilities versus programs. Such information may enable the migration team to identify whether the mainframe application 122 is heavily processing/transforming the dataset 124 using various programs or just massaging the dataset 124 via utilities and/or moving the dataset 124 for other applications 122 to consume.

The dataset XREF report may further enable the migration team to determine integration points between applications. In particular, the report may aid in determining how many datasets 124 are created by an application 122 being migrated, and whether datasets 124 are created by other applications 122 and consumed by the application 122 being migrated. The report may further indicate whether datasets 124 created by the application 122 to be migrated are consumed by other legacy applications 122. In such cases, the migration team may need to ensure that the dataset 124 is fed back to the legacy applications 122 in the same format for business continuity.

The migration team may be able to discern other information for such reports. For example, the report may permit the migration team to determine whether any of the datasets 124 are being transferred to other locations for processing. For example, one or more datasets 124 may be transferred to another location via a FTP utility program. In such case, the migration team may need to ascertain the usage of such dataset 124 at the other location in order to determine whether the dataset 124 must maintain the same format for business continuity.

Figure 5:
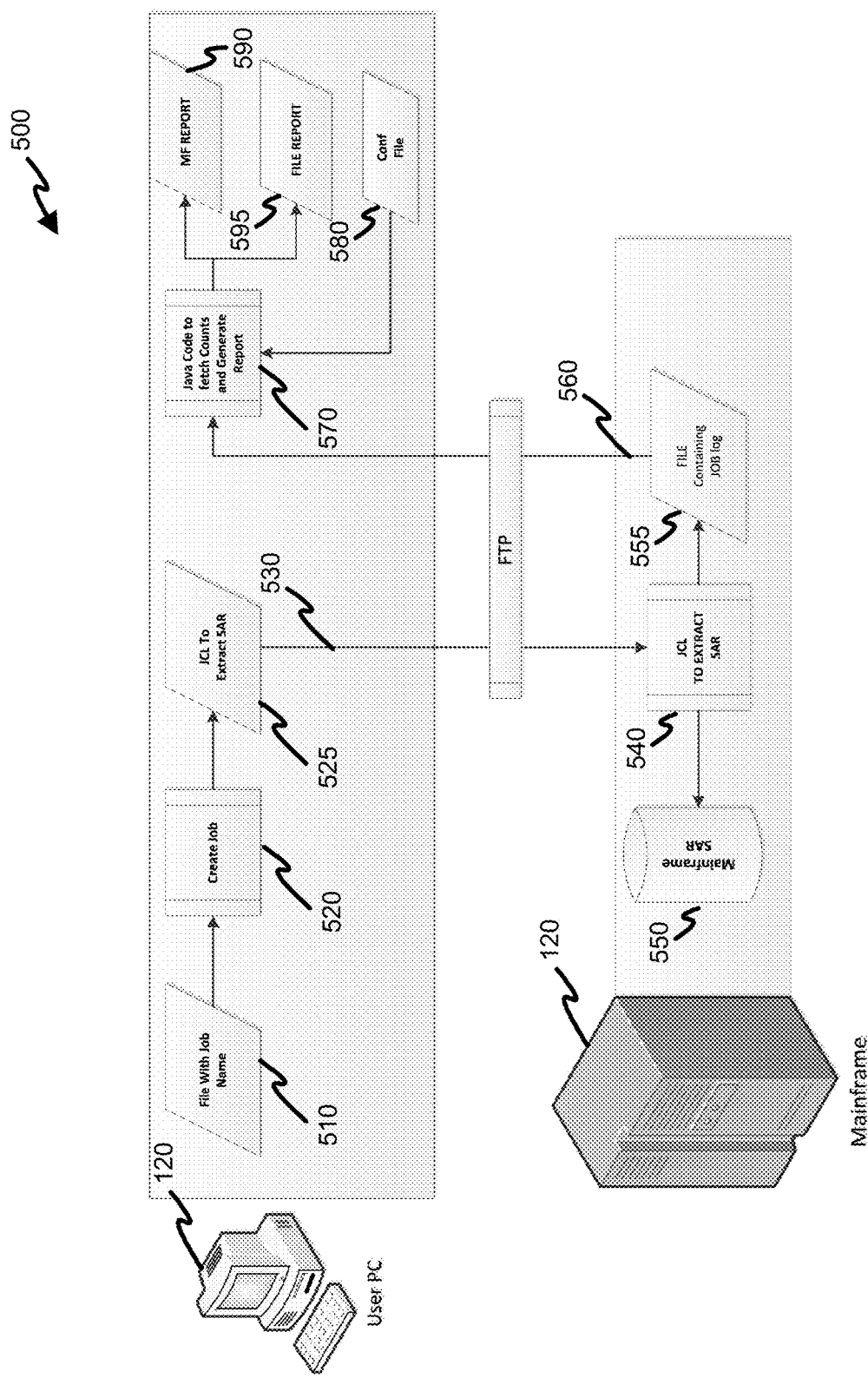
FIG. 5 shows a flowchart for an example embodiment of the RT statistics generator of the migration system of FIG. 1.

Referring now to FIG. 5, an example embodiment 500 of the RT statistics generator 216 is shown. The RT statistics generator 216 in the shown example embodiment receives as input a mainframe execution job log and a configuration file and produces as output one or more RT statistics reports. The RT statistics reports may include runtime information such as, for example, elapse time of the job, CPU time used by the job, MIPS used by a job, and throughput of the job. Such runtime information may aid the migration team in identifying mainframe applications 122 whose migration is likely to provide a significant economic impact. For example, applications 122 that include jobs that consume a relatively high amount of CPU time, that process large amount of data, etc. generally cost to keep in service. Accordingly, such applications 122 are more likely to provide a significant economic impact if migrated than applications 122 that use less CPU time or process smaller amounts of data.

The runtime information provided by the RT statistics generator 216 may help the migration team understand and identify jobs which are the biggest CPU consumers, the jobs which process the largest datasets 124, the jobs which move the most data from one place to another, etc. With such runtime information, the migration team may plan and prioritize components which should be given more attention due to their larger return on investment if migrated to a new platform. Also, such runtime information may help the migration team to understand the job execution window (e.g. application A may execute all its jobs between 8 AM to 6 PM).

The testing phase of any migration effort is very crucial. Especially, production parallel testing in which the source system, with the legacy application 122 being migrated, and the target system, with the migrated application, execute in parallel and results are verified by comparing record counts of files/tables/consoles of source system versus the target system. Such parallel testing may ensure that the target system is behaving in same way as original source system. Such parallel testing is generally a tedious task and generally involves tremendous amount of manual efforts. The RT statistics generator 216 may help to automate aspects of the parallel testing process and by producing reports containing elapse time, mainframe job counts, and other runtime information. If a job runs multiple times a day, the RT statistics generator 216 may handle those situations too. Such runtime information generated by the RT statistics generator 216 may help the migration team to identify root cause of differences between the source system and target system.

To this end, FIG. 5 depicts details of an example embodiment 500 of the RT statistics generator 216. As depicted, the RT statistics generator 216 may include software modules executed on a terminal computer system 110 as well as software modules executed on a mainframe computer system 120. At 510, the terminal computer system 110 may receive a job file as input that identifies the jobs and/or the components of the application 122 being migrated. The terminal computer system 110, based on such file, may generate at 520 multiple jobs/scripts 525 to be executed on the mainframe computer system 120. The terminal computer system 110 at 530 may transfer these generated jobs/scripts 525 to the mainframe computer system 120 via an FTP utility or some other transfer technique. The mainframe computer system 130 at 540 may execute the transferred jobs/scripts to fetch desired information 555 from a System Assurance Report (SAR) report 550 maintained by the mainframe computer system 120 as a result of executing jobs. The mainframe computer system 120 at 560 may transfer back to the terminal computer system 110 information 555 obtained from the SAR report using an FTP utility or some other transfer technique. The terminal computer system 110 at 570 may parse the information received from the mainframe computer system 120 based on a configuration file 580 and generate a mainframe (MF) report 590 and a file report 595.

For each job, the MR report 590 may include a mainframe job name, a job execution date, a start time for the job execution, and an end time for the job execution. The MR report 590 may further include CPU time consumed by the job, millions of instructions used by the job assuming a job run of a predetermined period (e.g., 30 days), and a name of the mainframe system on which the job executed.

Similarly, for each job, the file report 595 may include a mainframe job name, a job execution date, a start time for the job execution, and an end time for the job execution. The file report 595 may further include a name of the file or table which the job accessed, and a number of record counts or times the job accessed the file.

Figure 6:
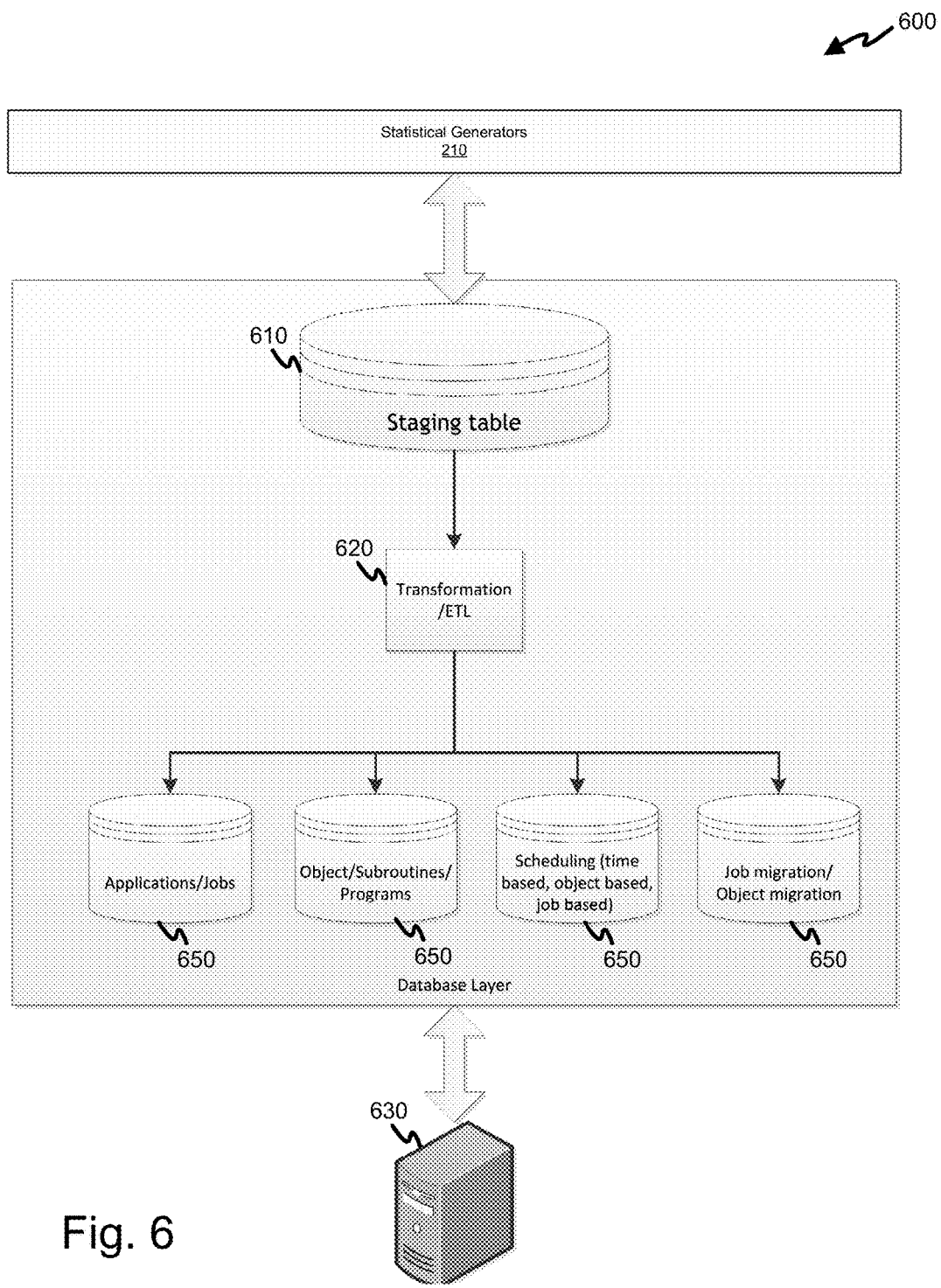
FIG. 6 shows an example embodiment of a web-enabled application provided by the migration system shown in FIG. 1.

Referring now to FIG. 6, an example embodiment 600 of the web-enabled application 132 is shown. The web-enabled application 132 may permit migration team members as well as other business stakeholders to mine the legacy statistical information extracted by the stat generators 210. In particular, the web-enabled application 132 may permit the generation of various reports and metrics to augment tracking of application migration. The web-enabled application 132 may further serve as a data store for end-to-end migration data. Augmenting the stat generators 210 with the web-enabled application 132 may provide the migration team with advanced features such as dashboards, project tracking and state management, data access, end-to-end traceability, and job flow/schedule diagrams that permit business executives to quickly assess ongoing migration of multiple applications.

FIG. 6 depicts how various information extracted using stat generators 210 may be fed to web-enabled application 132. As shown, the web-enabled application 132 may include a database staging area 610. The database staging area 610 may provide a specific location to which the various stat generators 210 may store their generated legacy statistical information. In one example embodiment, the legacy statistical information is stored to the database staging area in a raw format of the various stat generators 210.

The web-enabled application 132 may further include a transformation/ETL (extract, transform, load) component 620. The transformation/ETL component 620 may comprise a series of small scripts, which read data from the database staging area 610, transform the data into format used by the operational tables 650, and populate the operational tables 650 with the transformed data. The transformation/ETL component 620 may also derive further information from the data read from the data staging area 610 by applying various business rules. For example, the transformation/ETL component 620 may add average MIPS information for each job of a particular application to obtain MIPS information for the application itself.

The web-enabled application 132 may further include various database or operational tables 650 that provide a logical/physical data model. The logical/physical model may form a central database for the web-based application 132 to permit accessing and storing data by various users. In particular, the web-enable application 132 may include a physical data model which categorizes data captured by various generators 212, 214, 216 into application information, job/proc information, object information, subroutine/program information, database/attribute information, job migration information, and object migration information.

Finally, the application server computer system 130 may host and execute the web-enable application 132. In particular, the application server computer system 130 may permit migration team members and/or other stakeholders to log in and access the legacy statistical information of the various database tables 650. Furthermore, the web-enabled application 132 may provide dashboards, reports and user forms that aid in planning, tracking and implementing the migration effort.

Figure 7:
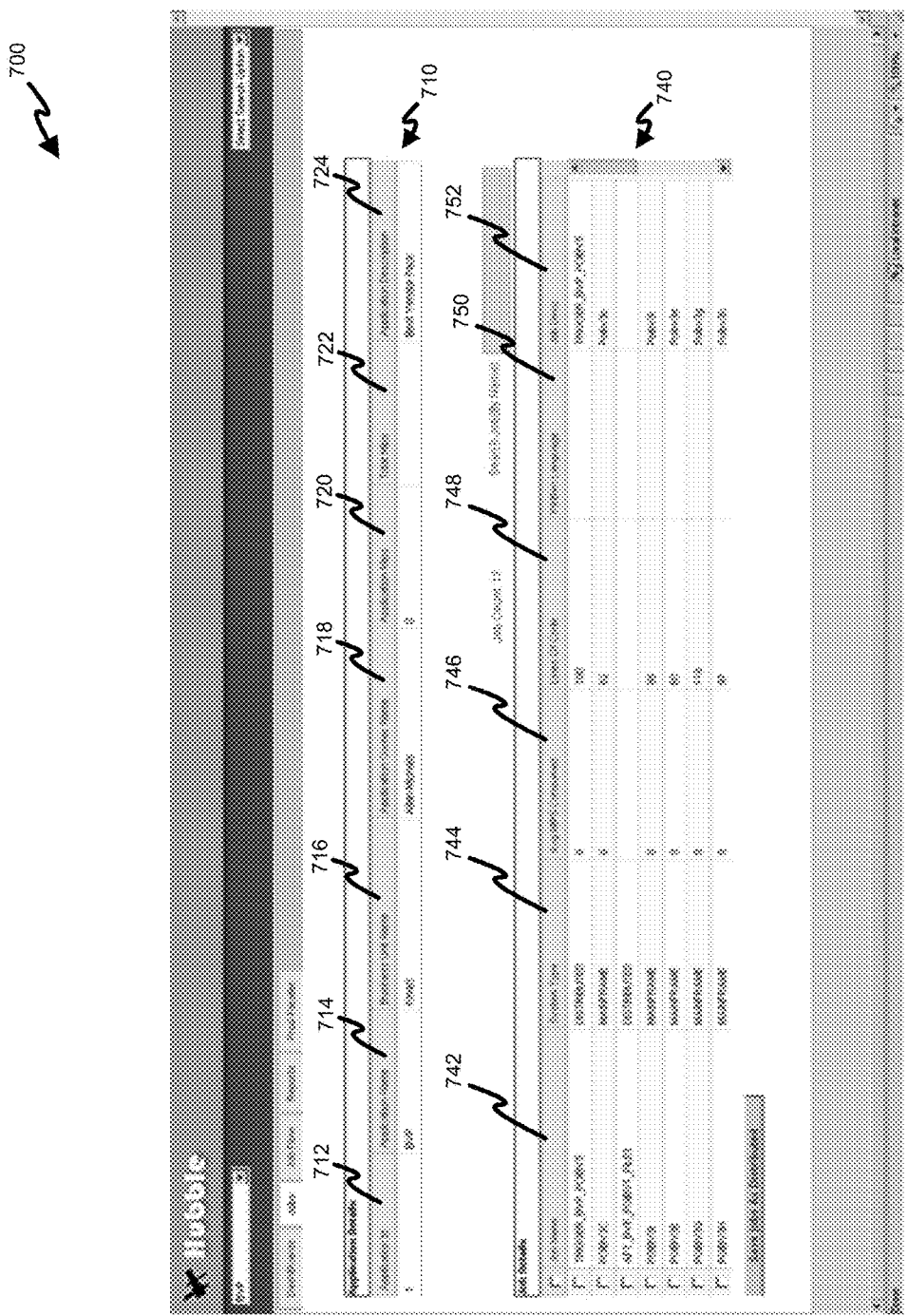
FIGS. 7, 8, and 9 show example embodiments of user interfaces provided by the web-enabled application of FIG. 6.
Figure 8:
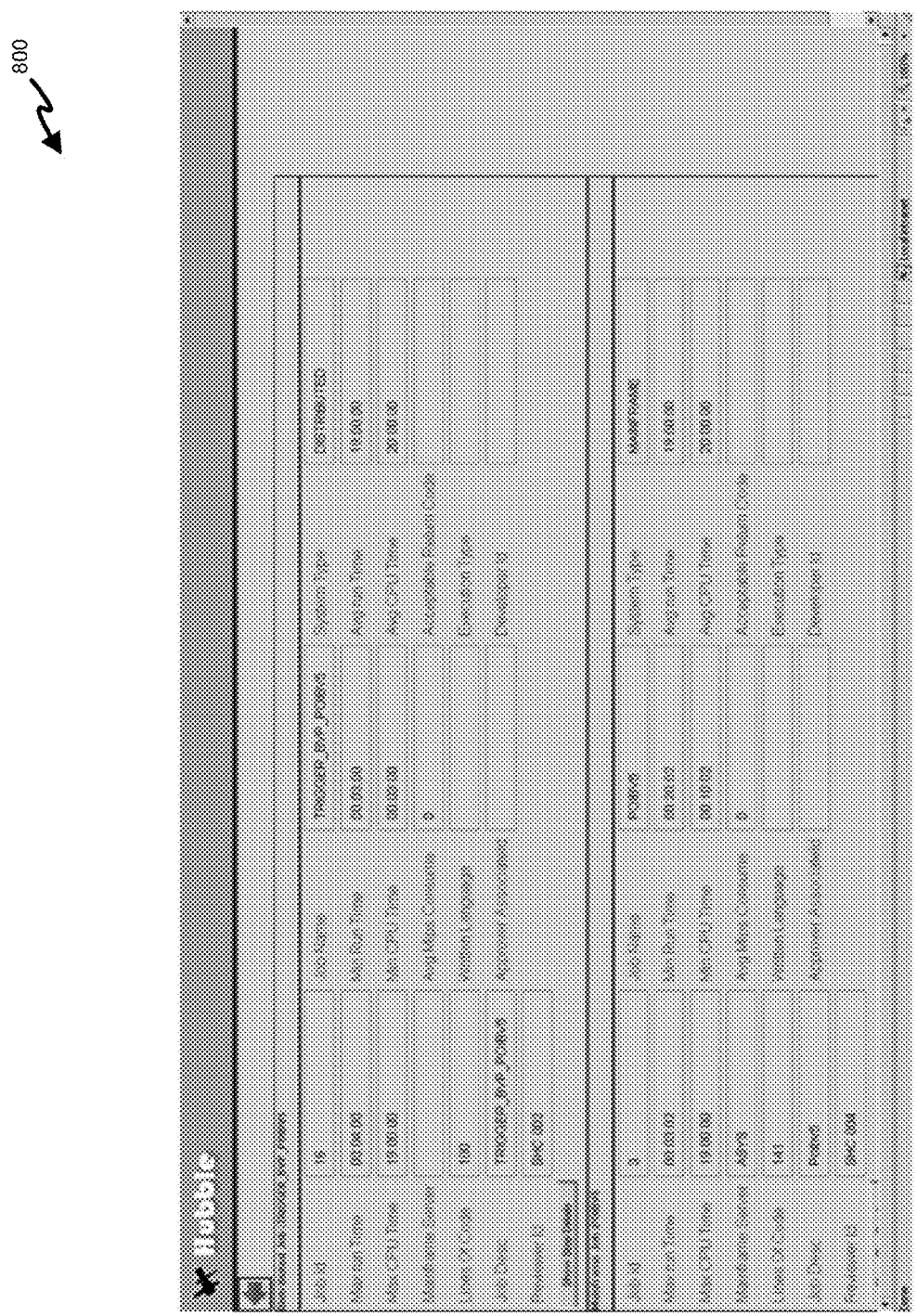
Figure 9:
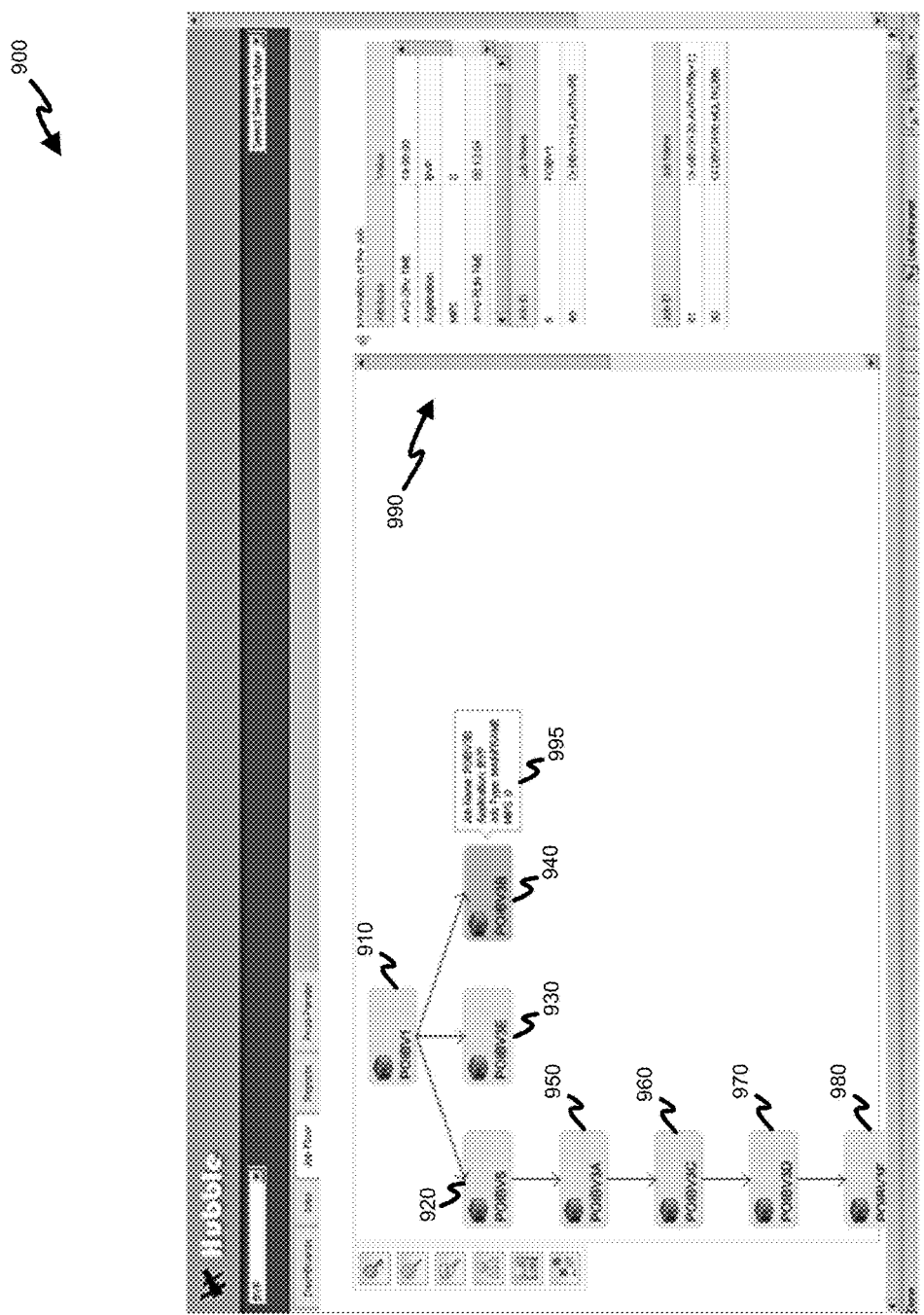

Referring now to FIGS. 7, 8, 9, example GUI interfaces are depicted which may be provided by the web-enabled application 132. Referring now to FIG. 7, a GUI interface 700 that depicts various information regarding a selected application 122 is shown. In particular, interface 700 may include a table 710 that provides information regarding the selected application 122. As shown, table 710 may provide an application identifier (ID) 712, an application name 714, a business unit name 716, an application owner name 718, an application MIPS 720, a total MIPS 722, and an application description 724 for the selected application 122. The interface 700 may further include another table 740 that provides job details for each job of the selected application 122. As shown, table 740 may provide a job name 742, a system type 744, an average MIPS consumed 746, lines of code 748, an indication 750 of the language in which the job is written, and a job description 752.

It should be appreciated that such reports greatly aid a migration team in assessing a particular application 122 and its jobs. Moreover, the interface 700 may permit a user to select one or more jobs in the lower table 740 in order to obtain greater details regarding such job. For example, FIG. 8 depicts an example interface 800 that provides further runtime details for a couple of selected jobs.

Besides tabular and form information as shown in FIGS. 7 and 8, the web-enabled application 132 may also provide various graphical depictions of the gathered legacy statistical information. For example, FIG. 9 provides a graphical depiction the relationships between various jobs of an application. In particular, FIG. 9 shows that jobs 920, 930, 940 are called by job 910. Furthermore, FIG. 9 shows that job 950 calls job 960 which calls job 970 which calls job 980. Besides graphically depicting the call hierarchy, FIG. 9 further permits a user to select a job such as job 940 in order to obtain further details of the selected job. The interface 900 may provide such additional information for the selected job 940 in an information sidebar 990. Moreover, the interface 900 may also provide mouse over or tooltip information which provides limited information regarding a particular job in response to a user placing a mouse pointer over the depicted job as shown at 995.

Figure 10:
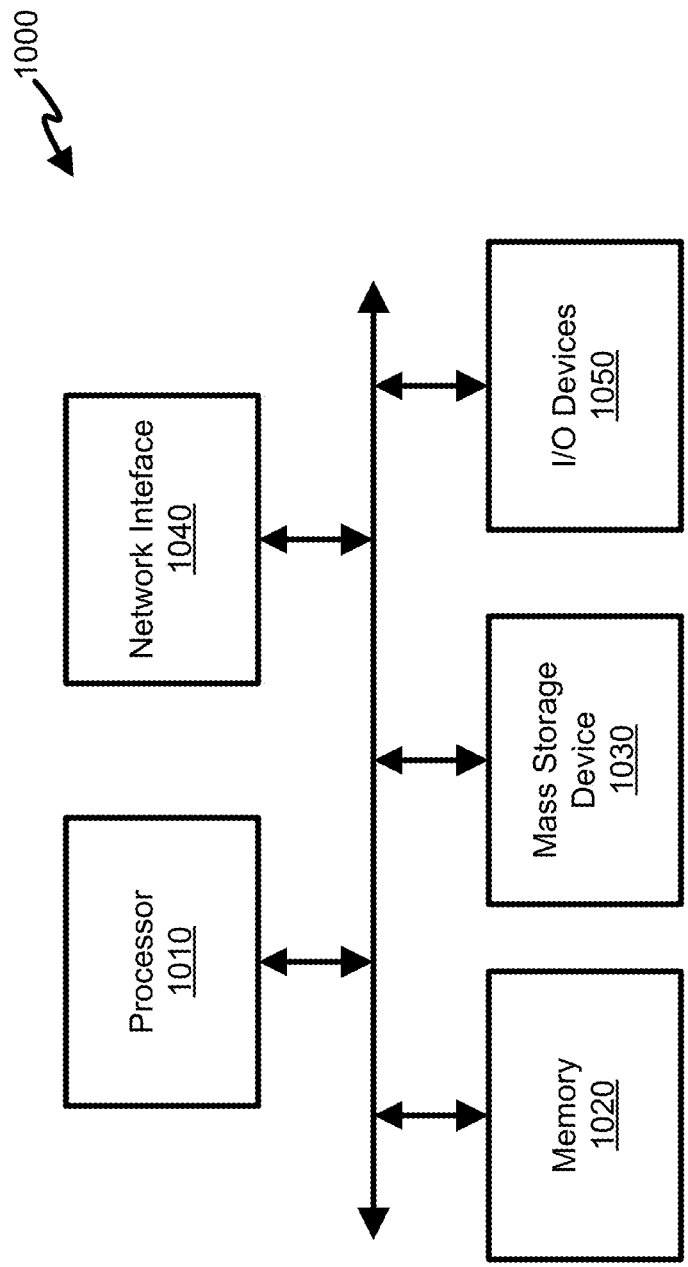
FIG. 10 shows an example embodiment of a computer system suitable for implemented various computer systems of the migration system 100 shown in FIG. 1.

As noted above, the migration system 100 may include computer systems 110, 120, 130. FIG. 10 depicts an example embodiment of a computer system 1000 suitable for implementing the computer systems 110, 120, 130. As shown, the computer system 1000 may include a processor 1010, a memory 1020, a mass storage device 1030, a network interface 1040, and various input/output (I/O) devices 1050. The processor 1010 may be configured to execute instructions, manipulate data and generally control operation of other components of the computer system 1000 as a result of its execution. To this end, the processor 1010 may include a general purpose processor such as an x86 processor or an ARM processor which are available from various vendors. However, the processor 1010 may also be implemented using an application specific processor and/or other logic circuitry.

The memory 1020 may store instructions and/or data to be executed and/or otherwise accessed by the processor 1010. In some example embodiments, the memory 1020 may be completely and/or partially integrated with the processor 1010.

In general, the mass storage device 1030 may store software and/or firmware instructions which may be loaded in memory 1020 and executed by processor 1010. The mass storage device 1030 may further store various types of data which the processor 1010 may access, modify, and/otherwise manipulate in response to executing instructions from memory 1020. To this end, the mass storage device 630 may comprise one or more redundant array of independent disks (RAID) devices, traditional hard disk drives (HDD), solid-state device (SSD) drives, flash memory devices, read only memory (ROM) devices, etc.

The network interface 1040 may enable the computer system 1000 to communicate with other computer systems directly and/or via network 150. To this end, the networking interface 1040 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc), and/or some other type of networking interface capable of providing a communications link between the computer system 1000 and network 150 and/or another computer system.

Finally, the I/O devices 1050 may generally provide devices which enable a user to interact with the computer system 1000 by either receiving information from the computer system 1000 and/or providing information to the computer system 1000. For example, the I/O devices 1050 may include display screens, keyboards, mice, touch screens, microphones, audio speakers, etc.

While the above provides general aspects of a computer system 1000, those skilled in the art readily appreciate that there may be significant variation in actual implementations of a computer system. For example, a terminal computer system may use different components and may have a different architecture than a mainframe computer system. However, despite such differences, computer systems generally include processors that execute software and/or firmware instructions in order to implement various functionality. As such, the above described aspects of the computer system 1000 are not presented from a limiting standpoint but from a generally illustrative standpoint. Aspects of the present application may find utility across a vast array of different computer systems and the intention is not to limit the scope of the present application to a specific computer system, computing device, and/or computing platform beyond any such limits that may be found in the appended claims.

Various example embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain example embodiments may be implemented as a plurality of instructions on a non-transitory, computer readable storage medium such as, for example, flash memory devices, hard disk devices, compact disc media, DVD media, EEPROMs, etc. Such instructions, when executed by one or more computing devices, may result in the one or more computing devices providing migration tools to aid migration team members in migrating application 122 from a mainframe computer system 120 to a lower cost platform as described above.

While the present invention has been described with reference to certain example embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A computer-implemented method that aids in migrating a mainframe application from a mainframe to another platform, the method comprising:
    transferring copies of mainframe components of the mainframe application from the mainframe to a computer system;
    executing one or more stat generators on the computer system that parse the transferred copies of the mainframe components to extract legacy statistical information regarding cross references between jobs of the mainframe application and procedures used by the jobs;
    transferring the extracted legacy statistical information to a database staging area of an application server;
    executing a transformation component on the application server that reads the extracted legacy statistical information from the database staging area, transforms the read legacy statistical information into a predefined format, and populates operational tables of the application server with the transformed legacy statistical information;
    generating, with the application server from the transformed legacy statistical information, at least one report that describes structural aspects of the mainframe application; and
    presenting, via the computer system, the at least one report to facilitate migration of the mainframe application to the another platform.

2. The computer-implemented method of claim 1, wherein said executing the one or more stat generators further parses the jobs of the mainframe application to extract further legacy statistical information regarding steps and programs of each procedure used by the jobs.

3. The computer-implemented method of claim 1, further comprising said executing the one or more stat generators further parses each program used by the jobs of the mainframe application to extract further legacy statistical information regarding the programs used by the jobs.

4. The computer-implemented method of claim 1, further comprising said executing the one or more stat generators further parses each program used by the jobs of the mainframe application to extract further legacy statistical information regarding copybooks used by each program.

5. The computer-implemented method of claim 1, wherein said executing the one or more stat generators further parses the jobs of the mainframe application to extract further legacy statistical information regarding procedures, steps, programs, and files used by each job mainframe application.

6. The computer-implemented method of claim 1, wherein said executing the one or more stat generators further parses the jobs of the mainframe application to extract further legacy statistical information regarding dataset tables used by the jobs and CRUD (create, read, update, delete) operations performed on the dataset tables.

7. The computer-implemented method of claim 1, further comprising:
    identifying datasets used by the mainframe application;
    identifying programs of the mainframe application that create and/or access the identified datasets;
    parsing the identified programs to extract further legacy statistical information comprising record layout information for the identified datasets; and
    generating at least one report that provides information regarding the record layout information for the identified datasets and usage of the identified datasets by the identified programs.

8. The computer-implemented method of claim 7, further comprising parsing copybooks referenced by the identified programs to extract further record layout information for the identified datasets.

9. The computer-implemented method of claim 1, wherein said executing the one or more stat generators further parses job files, wherein each job file defines a job and specifies steps to be executed as a result of executing the job.

10. The computer-implemented method of claim 1, wherein said executing the one or more stat generators further parses job files, wherein each job file defines a job and specifies, in a job control language, steps to be executed as a result of executing the job.

11. The computer-implemented method of claim 1, wherein said executing the transformation component derives further legacy statistical information from the read legacy statistical information.

12. One or more non-transitory computer-readable storage devices comprising a plurality of instructions, that in response to being executed, cause:
    a computer system to:
        transfer copies of mainframe components of a mainframe application from a mainframe to the computer system;
        execute one or more stat generators that parse the transferred copies of the mainframe components to extract legacy statistical information regarding cross references between jobs of the mainframe application and procedures used by the jobs;

transfer the extracted legacy statistical information to a database staging area of an application server; and present at least one report that describes structural aspects of the mainframe application; and the application server to:

execute a transformation component that reads the extracted legacy statistical information from the database staging area, transforms the read legacy statistical information into a predefined format, and populates operational tables of the application server with the transformed legacy statistical information; and generate, from the transformed legacy statistical information, the at least one report that describes structural aspects of the mainframe application.

13. The one or more non-transitory computer-readable storage devices of claim 12, wherein the plurality of instructions further cause the computer system to parse the jobs of the mainframe application to extract further legacy statistical information regarding steps and programs of each procedure used by the jobs.

14. The one or more non-transitory computer-readable storage devices of claim 12, wherein the plurality of instructions further cause the computer system to parse the jobs of the mainframe application to extract further legacy statistical information regarding dataset tables used by the jobs and CRUD (create, read, update, delete) operations performed on the dataset tables.

15. The one or more non-transitory computer-readable storage devices of claim 12, wherein the plurality of instructions further cause:

the computer system to:
identify datasets used by jobs of the mainframe application;
identify programs of the mainframe application that create and/or access the identified datasets; and
parse the identified programs to extract further legacy statistical information comprising record layout information for the identified datasets; and the application server to generate the least one report that further provides information regarding the record layout information for the identified datasets and usage of the identified datasets by the identified programs.

16. The one or more non-transitory computer-readable storage devices of claim 15, wherein the plurality of instructions further cause the computer system to parse copybooks referenced by the identified programs to extract further record layout information for the identified datasets.

17. The one or more non-transitory computer-readable storage devices of claim 12, wherein the plurality of instructions further cause the computer system to parse job files, wherein each job file defines a job and specifies steps to be executed as a result of executing the job.

18. The one or more non-transitory computer-readable storage devices of claim 12, wherein the plurality of instructions further cause the application server system to derive, via execution of the transformation component, further legacy statistical information from the read legacy statistical information.

* * * * *